(12) United States Patent
Conradt et al.

(10) Patent No.: US 7,681,219 B2
(45) Date of Patent: Mar. 16, 2010

(54) INTERACTIVE JOB CHANNEL

(75) Inventors: Jonathan I Conradt, Redmond, WA (US); Gagan Arora, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 832 days.

(21) Appl. No.: 11/303,604

(22) Filed: Dec. 16, 2005

(65) Prior Publication Data

US 2007/0143817 A1 Jun. 21, 2007

(51) Int. Cl.
H04N 7/173 (2006.01)
(52) U.S. Cl. .......................................... 725/86; 725/109
(58) Field of Classification Search ............... 725/1–153
See application file for complete search history.

(56) References Cited

U.S. PATENT DOCUMENTS

| | | | |
|---|---|---|---|
| 5,978,768 A * | 11/1999 | McGovern et al. ............. | 705/1 |
| 6,160,989 A | 12/2000 | Hendricks et al. | |
| 6,177,931 B1 * | 1/2001 | Alexander et al. ............. | 725/52 |
| 6,463,585 B1 | 10/2002 | Hendricks et al. | |
| 6,753,927 B2 | 6/2004 | Shtyrenkov | |
| 6,795,973 B1 | 9/2004 | Estipona | |
| 7,191,176 B2 * | 3/2007 | McCall et al. ................. | 707/6 |
| 7,320,025 B1 * | 1/2008 | Steinberg et al. ............. | 709/217 |
| 2002/0056109 A1 * | 5/2002 | Tomsen ........................ | 725/60 |
| 2002/0059594 A1 | 5/2002 | Rasmussen et al. | |
| 2002/0156674 A1 * | 10/2002 | Okamoto et al. .............. | 705/11 |
| 2002/0157099 A1 | 10/2002 | Schrader et al. | |
| 2004/0003412 A1 * | 1/2004 | Halbert ........................ | 725/112 |
| 2004/0015983 A1 | 1/2004 | Lemmons | |
| 2004/0073947 A1 | 4/2004 | Gupta | |
| 2004/0117845 A1 * | 6/2004 | Karaoguz et al. ........... | 725/134 |
| 2005/0028206 A1 | 2/2005 | Cameron et al. | |
| 2005/0160458 A1 * | 7/2005 | Baumgartner ................ | 725/46 |
| 2006/0036647 A1 * | 2/2006 | Fichtner et al. ........... | 707/104.1 |
| 2007/0107021 A1 * | 5/2007 | Angel et al. .................. | 725/86 |

FOREIGN PATENT DOCUMENTS

WO WO2005089336 9/2005

OTHER PUBLICATIONS

Enhanced TV User Interface Guidelines, Cable Television Laboratories, Inc., 2005, Available at : http://www.opencable.com/downloads/specs/OC-GL-ETV-UIG-V01-050418.pdf, pp. ii-iv and 1-19.
Enhanced TV Application Messaging Specification, Cable Television Laboratories, Inc., 2004-2005, Available at: http://www.opencable.com/downloads/specs/OC-SP-ETV-AM-I02-050727.pdf, pp. ii-iv and 1-22.

(Continued)

Primary Examiner—Dominic D Saltarelli
Assistant Examiner—John Schnurr
(74) Attorney, Agent, or Firm—Lee & Hayes, PLLC

(57) ABSTRACT

Interactive job channel is described. In an embodiment, a viewer having a television-based client device can register an employment profile with a content provider. Employment-related media content can then be associated with the viewer according to the employment profile registered by the viewer, and when an interactive job channel is selected for viewing at the television-based client device, the employment-related media content associated with the viewer is provided by the content provider for viewing on the interactive job channel.

18 Claims, 7 Drawing Sheets

OTHER PUBLICATIONS

Digital Program Insertion, Retrieved from the Internet: http://www.cablelabs.com/projects/dpi/primer, Apr. 21, 2005, 2 pages.

Sandoval, Programmers Intro to OCAP, Available at: http://www.opencable.com/downloads/OCAP_Intro.pdf, Apr. 28, 2003, 4 pages.

Digital Program Insertion, available at <<http://www.cablelabs.com/projects/dpi/primer>>, Apr. 21, 2005, 2 pages.

"Enhanced TV Application Messaging Specification", Cable Television Laboratories, Inc., 2004-2005, available at <<http://www.opencable.com/downloads/specs/OC-SP-ETV-AM-I02-050727.pdf>>, pp. ii-iv and 1-22.

"Enhanced TV User Interface Guidelines", Cable Television Laboratories, Inc., 2005, available at <<http://www.opencable.com/downloads/specs/OC-GL-ETV-UIG-V01-050418.pdf>>, pp. ii-iv and 1-19.

Sandoval, "Programmers Intro to OCAP", available at <<http://www.opencable.com/downloads/OCAP_Intro.pdf>>, Apr. 28, 2003, 4 pages.

* cited by examiner

INTERACTIVE JOB CHANNEL

BACKGROUND

Television-based client devices, such as a digital video recorder (DVR), can be implemented to receive and/or record media content in the form of programs, on-demand videos, movies, and any other type of broadcast and/or interactive television-based entertainment and information. Additionally, the availability of on-demand programming, such as with recorded or cached on-demand and broadcast media content, as well as IP-based television (IPTV) media content, provides a viewer with the option to navigate and select on-demand media that may be of interest to the viewer.

A company or employer seeking to attract and hire new employees are generally not able to target job seekers and prospective employees effectively with broadcast television, newspaper, or magazine advertisements because it is difficult to evaluate demographics and target specific groups of people in specific locations. Further, it is difficult for job seekers to identify and locate prospective employers that have employment positions which are both available and within the capability of a person seeking employment.

SUMMARY

This summary is provided to introduce simplified concepts of interactive job channel which is further described below in the Detailed Description. This summary is not intended to identify essential features of the claimed subject matter, nor is it intended for use in determining the scope of the claimed subject matter.

In an embodiment of interactive job channel, a viewer having a television-based client device can register an employment profile with a content provider. Employment-related media content can then be associated with the viewer according to the employment profile registered by the viewer, and when an interactive job channel is selected for viewing at the television-based client device, the employment-related media content associated with the viewer is provided by the content provider for viewing on the interactive job channel.

In another embodiment of interactive job channel, the employment-related media content associated with the viewer includes a ticker display of job listings that are available employment positions targeted to the viewer based on the employment profile registered by the viewer. The employment-related media content can also include a general information video about an employer that is displayed along with the ticker display where the job listings are available employment positions associated with the employer. A job listing of an available employment position can be selected by the viewer to initiate any one or combination of communicating the employment profile of the viewer to the employer associated with the job listing; distinguishing the job listing at a Web site of the content provider for additional viewer input; recording an audio message from the viewer for communication to the employer associated with the job listing; and recording a video message from the viewer for communication to the employer associated with the job listing.

In another embodiment of interactive job channel, a content provider receives video assets from an employer seeking to attract prospective employees. The video assets from the employer can then be targeted to viewers that each have a television-based client device registered to a viewer, where the video assets are targeted to the viewers within a designated region based on a location of the television-based client device registered to each of the viewers and/or targeted to the viewers based on data known about each of the viewers. The content provider can then provide the video assets from the employer as employment-related media content to the television-based client devices of the viewers for viewing on an interactive job channel.

BRIEF DESCRIPTION OF THE DRAWINGS

The same numbers are used throughout the drawings to reference like features and components.

DETAILED DESCRIPTION

Interactive job channel is described in which embodiments provide that a television channel has employment-related media content displayed, some of which is associated and corresponds to a viewer that registers an employment profile with a content provider that delivers the employment-related media content. An interactive job channel can be implemented using video-on-demand and enhanced television techniques to create the job channel which is unique for each different viewer and showcases companies, employers, and job opportunities that match criteria determined from an employment profile for each viewer.

Interactive job channel also provides that companies and other employers can target new prospective employees directly while also presenting general information video content to attract the prospective employees. An interactive job channel provides that job seekers can watch video on-demand based commercials about a potential employer while available job positions with the employer scroll along in a ticker display. A job listing of an available employment position can be selected by the viewer to initiate any one or combination of sending an employment profile of the viewer to the employer associated with the job listing; distinguishing the job listing at a Web site of the content provider for additional viewer input; recording an audio message from the viewer for communication to the employer associated with the job listing; and recording a video message from the viewer for communication to the employer associated with the job listing.

While aspects of the described systems and methods for interactive job channel can be implemented in any number of different computing systems, environments, television-based entertainment systems, and/or configurations, embodiments of interactive job channel are described in the context of the following exemplary system architecture(s).

Figure 1:
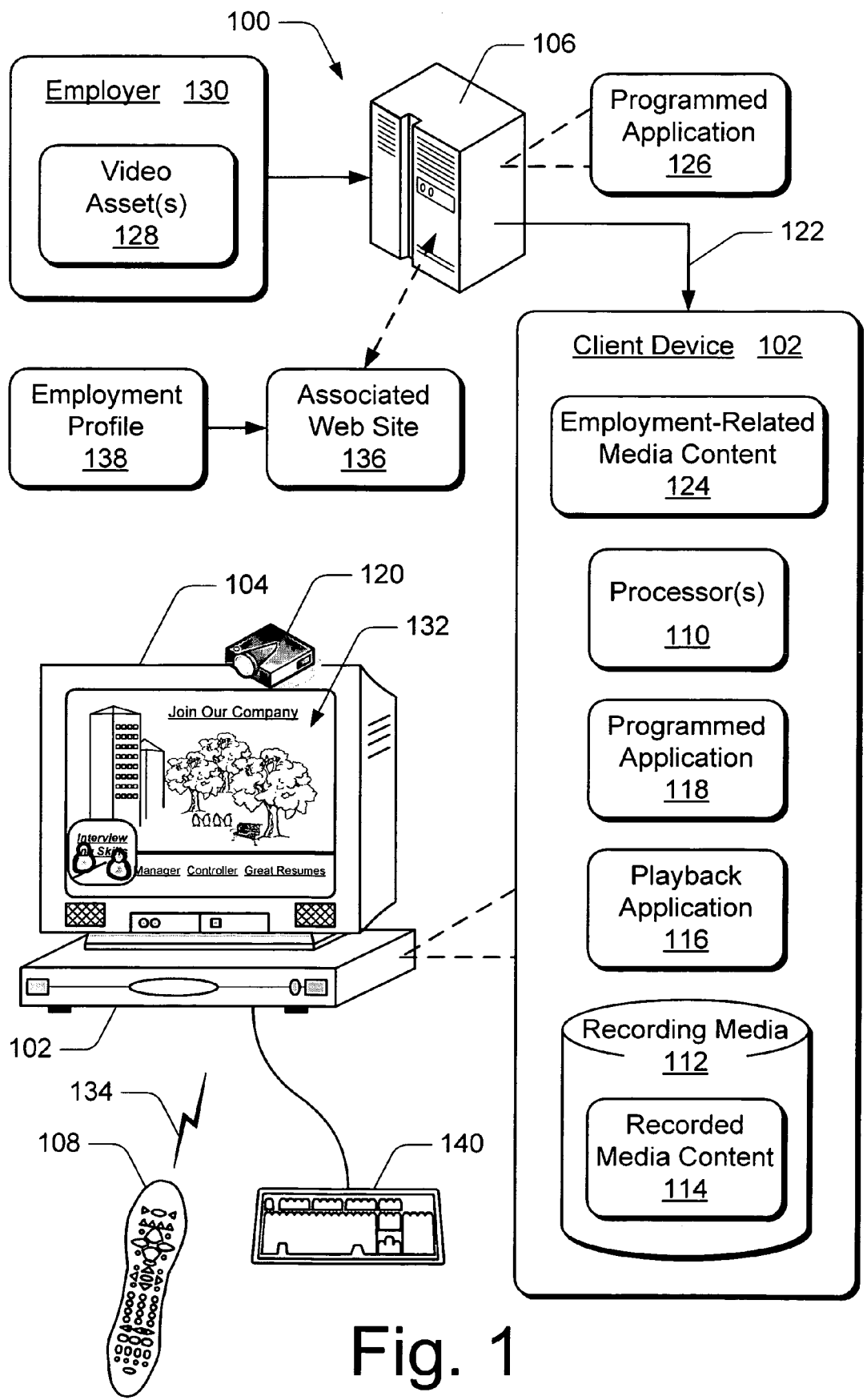
FIG. 1 illustrates an exemplary television-based system in which embodiments of interactive job channel can be implemented.

FIG. 1 illustrates an exemplary television-based system 100 in which embodiments of interactive job channel can be implemented. The system 100 includes a television-based client device 102, a display device 104, content provider(s) 106, and a remote control device 108. The display device 104 can be any type of television, monitor, or similar television-based display system that renders audio, video, and/or image data. The client device 102 and display device 104 together are but one example of a television-based client system, examples of which are described with reference to the exemplary IP-based television (IPTV) system 600 shown in FIG. 6, and with reference to the exemplary entertainment and information system 800 shown in FIG. 8.

Client device 102 can be implemented in any number of embodiments, such as a set-top box, a digital video recorder (DVR) and playback system, an appliance device, a gaming device, and as any other type of client device that may be implemented in a television-based entertainment and information system. In this example, client device 102 includes one or more processor(s) 110, recording media 112 that maintains recorded media content 114, a playback application 116, and a programmed application 118 which can be implemented as computer executable instructions and executed by the processor(s) 110 to implement embodiments of interactive job channel. Further, the television-based client system in this example includes video conferencing component(s) 120, such as a microphone, video camera, and/or Webcam. Additionally, client device 102 may be implemented with any number and combination of differing components as further described below with reference to the exemplary client device 700 shown in FIG. 7.

Recording media 112 can be implemented as a DVR system to record and maintain the recorded media content 114 which may be any form of on-demand and/or broadcast media content such as programs, movies, commercials, music, and similar audio, video, and/or image content that client device 102 receives and/or records. Further, client device 102 may access or receive additional recorded media content that is maintained with a remote data store (not shown), such as from a video-on-demand server, or media content that is maintained at a broadcast center or content provider that distributes the media content to subscriber sites and client devices.

The television-based client device 102 is configured for communication with the content provider(s) 106 via a communication network 122, which in this example, is an IP-based network. The client device 102 receives program content, various forms of media content, program guide data, advertising content, and other media content from content server(s) of the content provider(s) 106 via the IP-based network 122. For example, client device 102 can receive media content which is stored as the recorded media content 114, and can receive employment-related media content 124 from the content provider(s) 106.

The content provider 106 also includes a programmed application 126 to implement embodiments of interactive job channel. Although the programmed application 126 at content provider 106 and the programmed application 118 at client device 102 are each illustrated and described as single application programs, each of the programmed applications 118, 126 can be implemented as several component applications distributed to each perform one or more functions in a television-based system. Further, although the programmed application 118 at client device 102 and the programmed application 126 at content provider 106 are illustrated and described as separate application programs, the programmed applications 118, 126 can be implemented together as a single application program in the client device 102 and/or in the content provider 106 to implement embodiments of interactive job channel.

The content provider 106 can receive video asset(s) 128 from an employer 130 that is seeking to attract prospective employees. The video asset(s) 128 from the employer 130 may include a general information video about the employer or other similar audio, video, and/or image content intended to highlight the employer's company, business, products, place of business, and/or available employment positions. Similarly, other employment-related videos and information to help a prospective employee find employment, such as assistance with improving a resume, conducting a job search, and the like can be received from others that provide employment services and assistance. The content provider 106 can then provide the video asset(s) 128 received from the employer 130, as well as any other employment-related information, to the client device 102 as the employment-related media content 124. Other examples of employment-related media content 124 include training opportunities, information about trends in the job market, advertisements to attract prospective employees, and/or instructional videos to help prospective employees learn a language, prepare a resume, develop job interviewing skills, and the like.

The playback application 116 and/or the programmed application 118 in the client device 102 is a video control application that, in this example, can be implemented to control the playback of media content, such as the recorded media content 114, the employment-related media content 124, or other video on-demand media content, music, and any other audio, video, and/or image media content which can be rendered and/or displayed for viewing as an interactive job channel 132 on the display device 104. The playback application 116 is implemented to receive user-selectable content navigation input commands 134, such as from the remote control device 108 which includes various configuration and television-specific input keys, an input keypad, and various user-selectable input controls.

In this example, the content provider 106 has an associated Web site 136, such as would be accessible via the Internet from a Web browser implemented in a computing device and/or client device 102. A viewer that owns or leases the television-based client device 102 can access the Web site 136 that is associated with the content provider 106 and register an employment profile 138 of the viewer. The viewer can register the employment profile 138 using a computing device and/or the client device 102 to provide employment-related information with an interactive input device, such as keyboard 140 or another similar input or pointing device.

The employment profile 138 of the viewer can include contact information such as a phone number, a resume that may include education and experience, the type(s) of employment that is preferred, and any other information that may be submitted by a viewer as an on-line and/or employment profile when seeking employment. The content provider 106 can target the video asset(s) 128 received from the employer 130 to viewers based on employment profiles 136 that are received, or based on other data known about each of the viewers. The content provider 106 can then provide the video asset(s) 128 received from the employer 130 to the viewers that each have a television-based client device associated with, or registered to, the content provider 106. The video asset(s) 128 from the employer 130 are communicated or delivered to the content provider 102 as the employment-related media content 124 for viewing on the interactive job channel 132.

The programmed application 118 at client device 102 and/or the programmed application 126 at content provider 106 can be implemented as an enhanced television (ETV) application to implement embodiments of interactive job channel and to uniquely create the interactive job channel 132 for a viewer. The programmed application(s) 118, 126 associates the corresponding employment-related media content 124 with a viewer based on the employment profile 138 registered by the viewer with the content provider 106. The employment profile 138 can include an identifier of the viewer, such as a telephone number, that correlates the viewer with the television-based client device 102 so that the programmed application(s) 118, 126 can associate the viewer, the employment-related media content 124, and the television-based client device 102.

Figure 2:
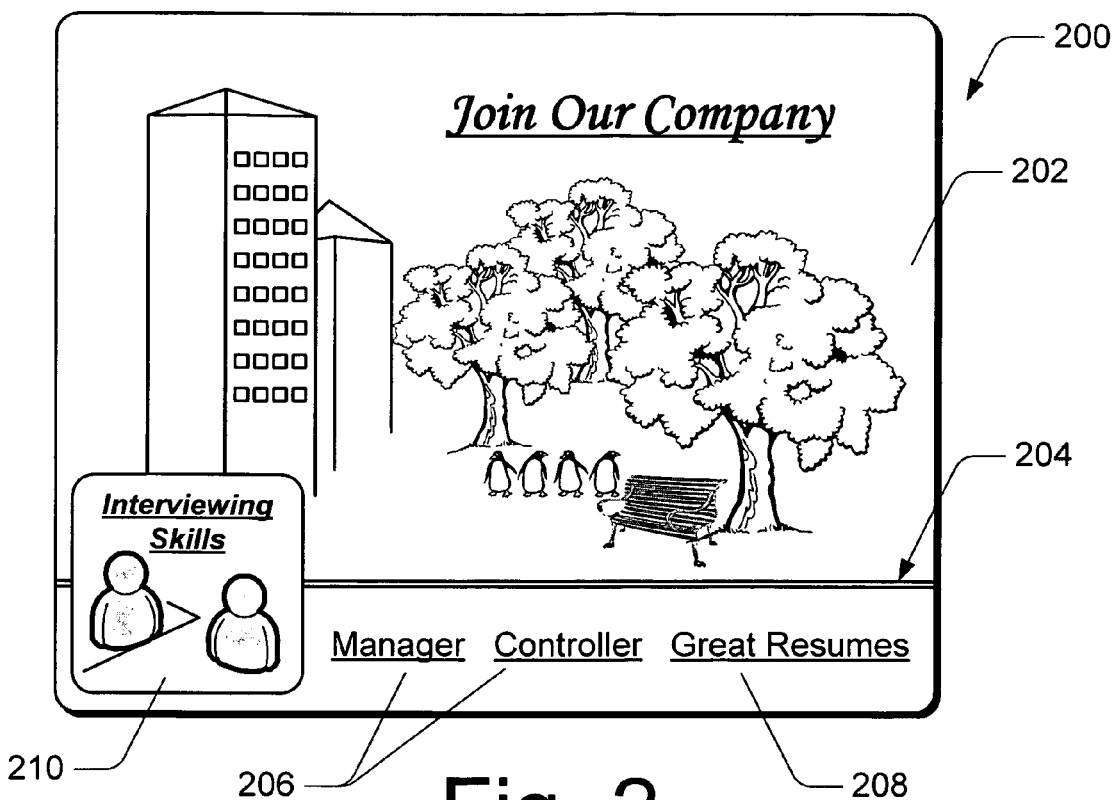
FIG. 2 illustrates an exemplary interactive job channel in an embodiment of interactive job channel.

FIG. 2 illustrates an exemplary interactive job channel 200 that includes a general information video 202 (e.g., Join Our Company) about an employer seeking to attract prospective employees. The interactive job channel 200 also includes a ticker display 204 of job listings 206 that are available employment positions targeted to a viewer based on the employment profile 138 registered with the content provider 106 by the viewer. In this example, the ticker display 204 also includes employment-related selectable content 208 to help a prospective employee find employment, such as assistance with improving a resume, conducting a job search, or even contacting others that provide employment services and assistance. Optionally, the interactive job channel 200 may include other forms of selectable media content 210 that is available as alternative forms of audio, video, and/or image content.

In this example, the general information video 202 describes and/or illustrates general information about a particular company or employer seeking to attract prospective employees and generally convey that the company is a great place to work. The job listings 206 shown in the ticker display 204 are targeted employment positions currently available through the company or employer. For example, the company or employer has "Manager" and "Controller" employment positions available which may correlate to employment preferences or information registered by the viewer in the employment profile 138.

Alternatively, the interactive job channel 200 can include the general information video 202 as well as the job listings 206 shown in the ticker display 204 where the job listings 206 are employment positions that are currently available through the company or employer, but are not targeted to any specific viewers. For example, a viewer may tune to, or select to watch, the interactive job channel 200, but not have registered an employment profile 138 with the Web site 136 associated with the content provider 106 that provides the employment-related media content 124 displayed on the interactive job channel 200. The programmed application(s) 118, 126 can be implemented to determine whether a viewer has a personalized subscription via the Web site 136, and if not, initiate displaying advertisements that encourage and/or instruct the viewer to register an employment profile 138 at the associated Web site 136.

Figure 3:
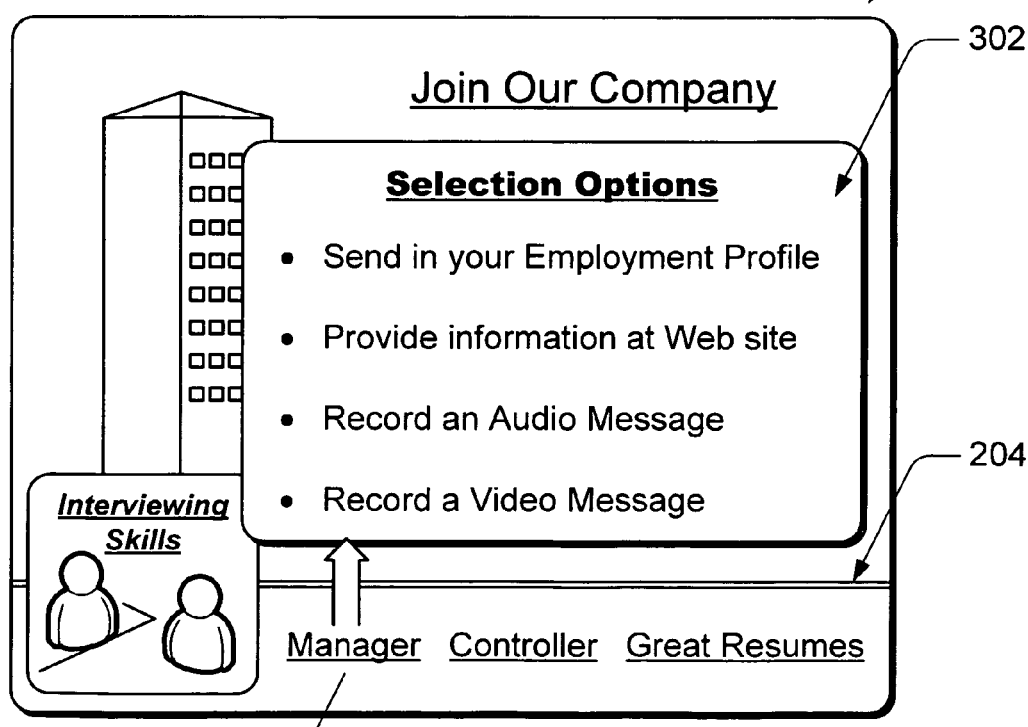
FIG. 3 illustrates another exemplary job channel in an embodiment of interactive job channel.

FIG. 3 illustrates another exemplary interactive job channel 300 that illustrates but one example of the interactive features that can be implemented when a job listing 206 is selected from the ticker display 204. For example, a viewer can initiate a selection of the "Manager" job listing 206 with the remote control device 108. The viewer-selectable input 134 is received by the client device 102 and the programmed application(s) 118, 126 initiate displaying a list of additional viewer-selectable options 302. In this example, a viewer can choose to have the employment profile 138 communicated directly to the company or employer associated with the job listing 206. Alternatively, the viewer can have the job listing 206 distinguished or otherwise identified at the associated Web site 136 so that the viewer can access the Web site 136 and provide additional employment information and/or research and review the employment position in more detail. Alternatively, or in addition, the viewer can record an audio and/or video message with the video conferencing component(s) 120 and have the audio and/or video message communicated directly to the company or employer associated with the job listing 206.

As an alternative to the list of additional viewer-selectable options 302 being displayed, the programmed application(s) 118, 126 may be optionally implemented to initiate one of the above described actions without an additional viewer input. For example, a viewer may initiate a selection of the "Manager" job listing 206 with the remote control device 108, and in response, the employment profile 138 is communicated to the employer associated with the job listing without an additional viewer input. Similarly, the viewer may initiate an additional selection of the "Controller" job listing with the remote control device 108, and in response, the employment profile 138 is again communicated to the employer associated with the job listing. The employer would then receive the employment profile 138 twice, or some other indication that the viewer is interested in both the "Manager" and the "Controller" jobs.

Embodiments of interactive job channel also provide that a content provider 106 can track viewer-initiated selections of job listings 206 and other employment-related selectable content 208 from the ticker display 204. The content provider 106 can then generate revenue and bill an employer 130 for not only targeting and delivering the video asset(s) 128 received from the employer 130, but also for viewer responses to the employer's interactive job listings 206 on the interactive job channels 200 and 300.

Methods for interactive job channel, such as exemplary methods 400 and 500 described with reference to respective FIGS. 4 and 5, may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 4:
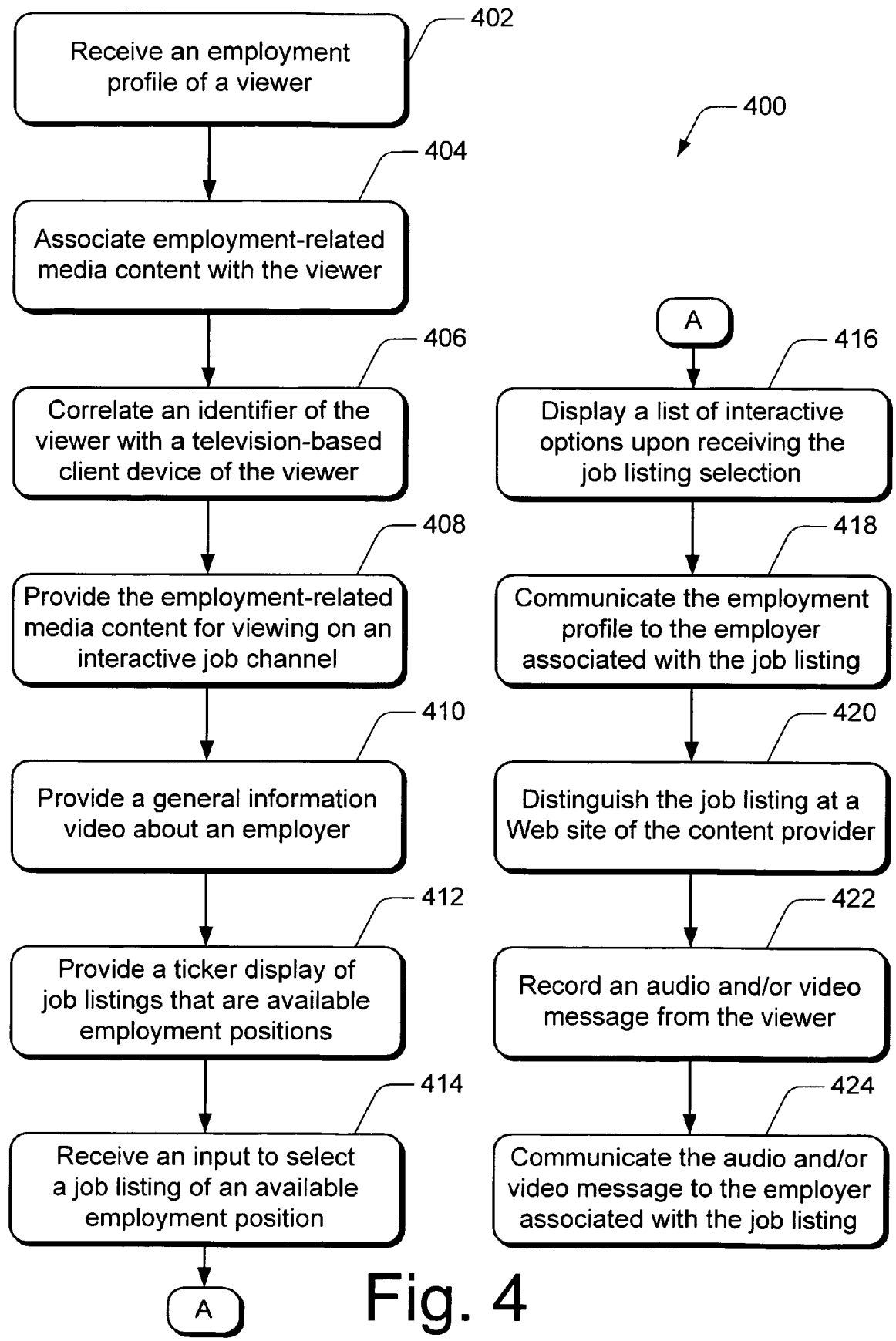
FIG. 4 illustrates exemplary method(s) for interactive job channel.

FIG. 4 illustrates an exemplary method 400 for interactive job channel and is described with reference to the television-based system 100 shown in FIG. 1 and the exemplary interactive job channels 200 and 300 shown in respective FIGS. 2 and 3. The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 402, an employment profile of a viewer is received. For example, the content provider 106 has an associated Web site 136 via which an employment profile 138 of a viewer is received. The employment profile 138 is registered by the viewer at the Web site 136 of the content provider 106 that provides the employment-related media content 124 to the television-based client device 102 of the viewer. At block 404, the employment-related media content is associated with the viewer according to the employment profile of the viewer. For example, the content provider 106 receives the video asset(s) 128 and other employment-related media content that is then associated with the viewer based on the information provided by the viewer in the employment profile 138.

At block 406, an identifier of the viewer from the employment profile is correlated with a television-based client device of the viewer. For example, the content provider 106 determines an identifier of the viewer, such as a telephone number, which also identifies the viewer as having the television-based client device 102. At block 408, the employment-related media content that is associated with the viewer is provided to the television-based client device for viewing on an interactive job channel. For example, content provider 106 provides or delivers the employment-related media content 124 that is associated with the viewer to the television-based client device 102 which is also associated with the viewer via the communication network 122. The employment-related media content 124 is then displayed on the interactive job channel 132 on display device 104 when the viewer tunes to, or changes the channel to, the interactive job channel 132.

At block 410, a general information video about an employer is provided. For example, the content provider 106 also provides general information videos and other employment-related videos and information to the client device 102 as the employment-related media content 124. A general information video about an employer can be received as the video asset(s) 128 from employer 130. Similarly, other employment-related videos and information to help a prospective employee find employment, such as assistance with improving a resume, conducting a job search, and the like can be received from others that provide employment services and assistance.

At block 412, a ticker display of job listings that are available employment positions is provided which is targeted to the viewer based on the employment profile registered by the viewer. For example, the content provider 106 provides or delivers employment-related media content 124 for a ticker display 204 on the interactive job channel 200. The ticker display 204 includes job listings 208 that are available employment positions targeted to the viewer having the television-based client device 102, and based on the employment profile 138 registered by the viewer at the Web site 136 associated with the content provider 106. The job listings 206 shown in ticker display 204 are available employment positions associated with the employer, and optionally, the general information video 202 about the employer is displayed along with the ticker display 204.

At block 414, a viewer-selectable input to select a job listing of an available employment position is received. For example, the client device 102 and/or the content provider 106 (via communication network 122) receives a viewer-selectable input 134 initiated with the remote control device 108 to select the "Manager" job listing 206 (also shown in FIG. 3). At block 416, a list of interactive options is displayed upon receiving the job listing selection. For example, the list of viewer-selectable options 302 is displayed as shown on the interactive job channel 300. Some of the viewer-selectable options include having the employment profile 138 communicated directly to the employer associated with the job listing 206, having the job listing 206 distinguished at the associated Web site 136, and/or recording an audio and/or video message via the video conferencing component(s) 120 and having the audio and/or video message communicated directly to the employer associated with the job listing 206.

At block 418, the employment profile of the viewer is communicated to the employer associated with the job listing. For example, if the viewer selects this option from the list of viewer-selectable options 302, or in direct response to the viewer selecting the job listing 206, the content provider 106 communicates the employment profile 138 directly to the employer 130 which indicates to the employer that the viewer is interested in the selected job listing.

At block 420, the job listing is distinguished at a Web site of the content provider. For example, if the viewer selects this option from the list of viewer-selectable options 302, or in direct response to the viewer selecting the job listing 206, the content provider 106 distinguishes or otherwise identifies the job listing at the associated Web site 136 so that the viewer can access the Web site and provide additional employment information and/or research and review the employment position in more detail.

At block 422, an audio and/or video message is recorded from the viewer. For example, if the viewer selects either of these options from the list of viewer-selectable options 302, or in direct response to the viewer selecting the job listing 206, the programmed application 118 initiates the video conferencing component(s) 120 or similar recording equipment to record the audio and/or video message. The client device 102 then communicates the audio and/or video message to the content provider 106 via the communication network 122. At block 424, the recorded audio and/or video message is communicated to the employer associated with the job listing. For example, the content provider 106 receives the audio and/or video message from the client device 102 and then communicates the recorded message directly to the employer 130 which indicates to the employer that the viewer is interested in the selected job listing.

Figure 5:
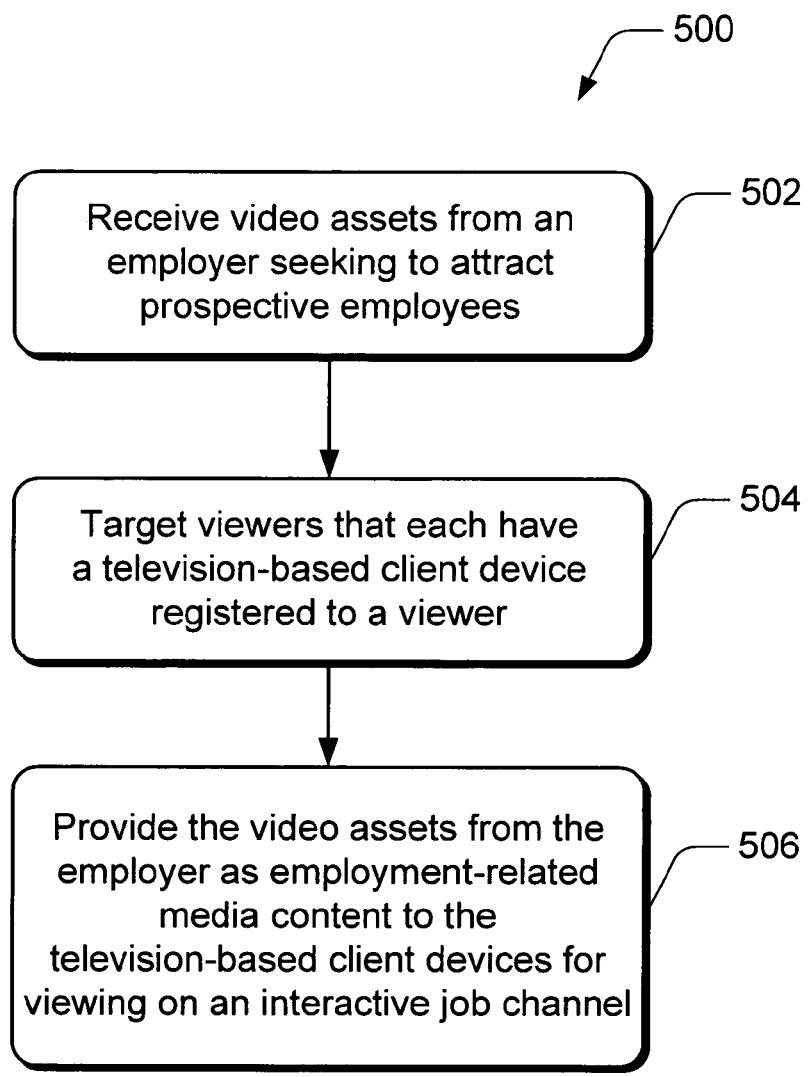
FIG. 5 illustrates exemplary method(s) for interactive job channel.

FIG. 5 illustrates an exemplary method 500 for interactive job channel and is described with reference to the television-based system 100 shown in FIG. 1 and the exemplary interactive job channels 200 and 300 shown in respective FIGS. 2 and 3. The order in which the method is described is not intended to be construed as a limitation, and any number of the described method blocks can be combined in any order to implement the method, or an alternate method. Furthermore, the method can be implemented in any suitable hardware, software, firmware, or combination thereof.

At block 502, video assets are received from an employer seeking to attract prospective employees. For example, the content provider 106 receives the video asset(s) 128 from the employer 130, and may also receive other employment-related media content from other employment assistance providers that want to provide media content for an interactive job channel.

At block 504, the video assets from the employer are targeted to viewers that each have a television-based client device registered to a viewer. For example, employer 130 may be a deli shop owner seeking to attract an employee for lunch time help that lives within walking distance of the deli, such as within four to five blocks. The employer 130 provides an advertisement (e.g., video asset 128) to the content provider 106 that targets the advertisement to viewers within the designated five block region and based on viewers that have television-based client devices 102 registered to, or leased from, the content provider 106. The advertisement may also be targeted to the viewers within the designated region based on other data known about each of the viewers, such as data derived from an employment profile 138 or from viewing habits of a viewer.

At block 506, the video assets from the employer are provided as employment-related media content to the television-based client devices for viewing on an interactive job channel. For example, content provider 106 provides or delivers the employment-related media content 124 to viewers within the designated region that have a television-based client device 102. The employment-related media content 124 is then displayed on the interactive job channel 132 on display device 104 when a viewer tunes to the interactive job channel 132.

Figure 6:
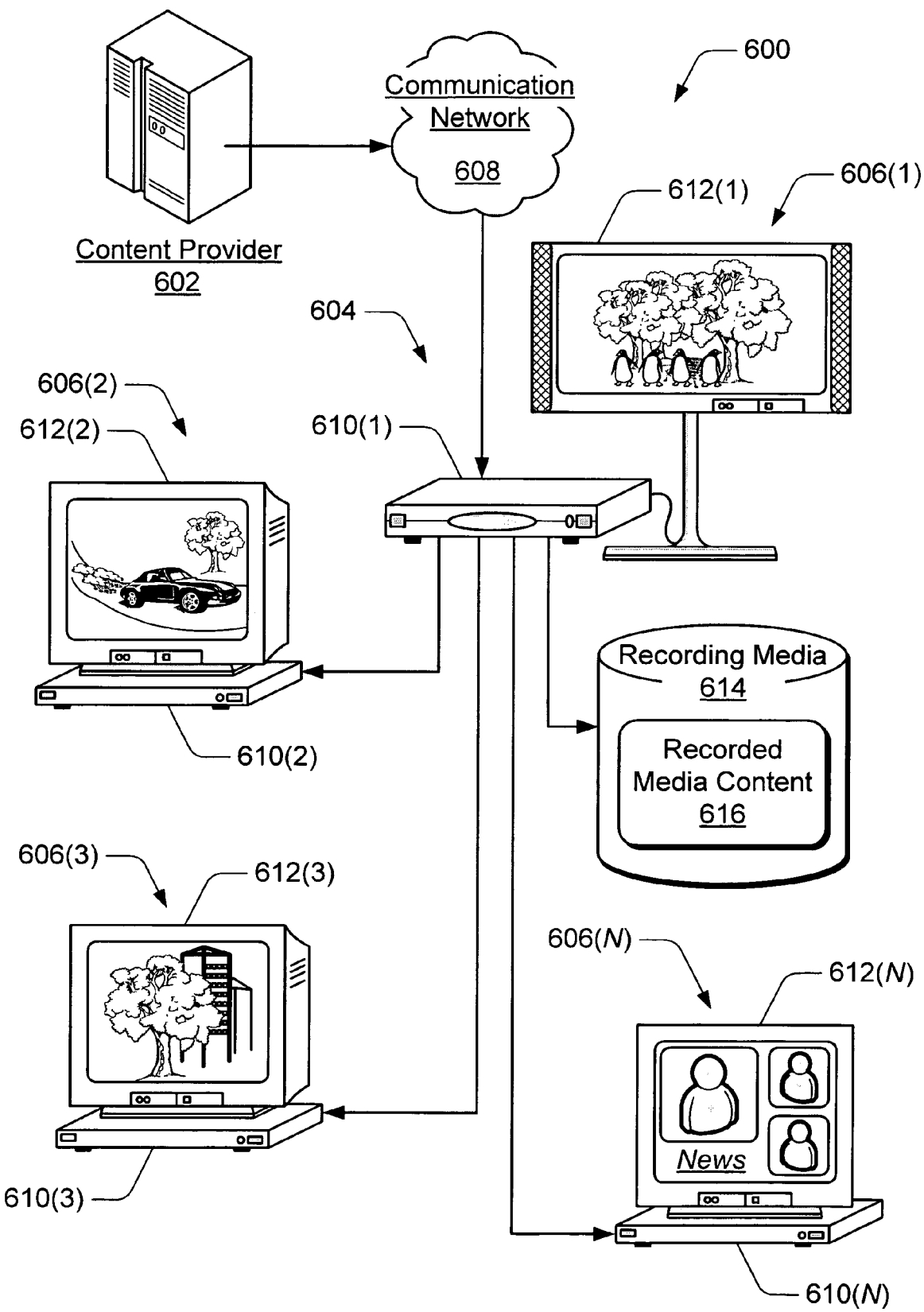
FIG. 6 illustrates an exemplary IP-based television (IPTV) system in which embodiments of interactive job channel can be implemented.

FIG. 6 illustrates an exemplary IP-based television (IPTV) environment 600 in which embodiments of interactive job channel can be implemented. The IPTV environment 600 includes a content provider 602 and a viewing system 604 that can include any number of television-based client systems 606. A client system 606(1) is configured for communication with the content provider 602 via a communication network 608 which, in this example, is an IP-based network. In addition to the client system 606(1), the viewing system 604 includes television-based client systems 606(2-N), and can represent a household viewing system that has several viewing areas, such as different rooms, for viewing television programming.

Television-based programs may include any form of programs, commercials, music, movies, video on-demand movies and other media content, recorded media content, interactive games, network-based applications, and any other similar audio, video, and/or image content. In addition, programming in general may include music streamed from a computing device to a client device, such as a television-based set-top box, and may also include video on-demand media content delivered from a server, a photo slideshow, and any other audio, video, and/or image content received from any type of media content source.

The television-based client systems 606(1-N) may be implemented with any number and combination of differing components as further described below with reference to the exemplary client device 700 shown in FIG. 7. Further, the IPTV environment 600 may be implemented with any number and combination of differing components as described below with reference to the exemplary entertainment and information system 800 shown in FIG. 8.

The television-based client system 606(1) includes a client device 610(1) and a display device 612(1), such as any type of television, monitor, or similar television-based display system that renders audio, video, and/or image data. Similarly, the television-based client systems 606(2-N) each include a respective client device 610(2-N) and a respective display device 612(2-N). Each client device 610 can be implemented in any number of embodiments, such as a television-based set-top box, a digital video recorder (DVR) and playback system, an appliance device, a gaming system, and as any other type of client device that may be implemented in a television-based entertainment and information system.

Client device 610(1) receives program content from content provider 602 via the communication network 608. In the example viewing system 604, client device 610(1) is a master client device that receives one or more data streams from content provider 602 and then arbitrates stream allocation to distribute the data streams, one each, to one or more of the other satellite client devices 610(2-N). The satellite client devices 610(2-N) connect to the master client device 610(1) to receive a data stream for live television, delayed program viewing, and/or recorded DVR playback. The data streams are allocated by the content provider 602 to the viewing system 604 (e.g., a household), and the data streams can be any combination of high definition and/or standard definition television data streams. For example, the viewing system 604 may receive one high definition data stream and three standard definition data streams depending upon available bandwidth to deliver the data streams.

Although the data streams are not shown specifically, the arrowed communication links illustrate various data communication links which include the data streams. Additionally, the arrowed communication links are not intended to be interpreted as a one-way communication link from client device 610(1) to client device 610(2), for example. It is contemplated that any one or more of the arrowed communication links can facilitate two-way data communication, such as from client device 610(2) to client device 610(1) for example, and from client device 610(1) to content provider 602.

In this system, the master client device 610(1) receives four (4) data streams from the content provider 602 via the communication network 608. A viewing selection from a first data stream is shown for viewing on display device 612(1) at the television-based client system 606(1). A second data stream is directed from the master client device 610(1) to the television-based client system 606(2) and a viewing selection from a second data stream is shown for viewing on display device 612(2). Similarly, a third data stream is directed from the master client device 610(1) to the television-based client system 606(3) and a viewing selection from the third data stream is shown for viewing on display device 612(3). Additionally, a fourth data stream is directed from the master client device 610(1) to the television-based client system 606(4) and a viewing selection from the fourth data stream is shown for viewing on display device 612(4).

The viewing system 604 also includes recording media 614 which can be implemented as a DVR system to record and maintain media content 616, such as any form of programs, movies, and similar audio, video, and/or image content that may be distributed or otherwise received from content provider 602. In one embodiment, the recording media can be implemented as an independent component of the viewing system 604 and connected to the master client device 610(1). Alternatively, the recording media 614 can be implemented as a component of the master client device 610(1) which manages recordings initiated from any of the other satellite client devices 610(2-N). In yet another embodiment, the recording media 614 may be a distributed recording system where any one or more of the client devices 610(1-N) include recording media that is centrally managed by the master client device 610(1).

Figure 7:
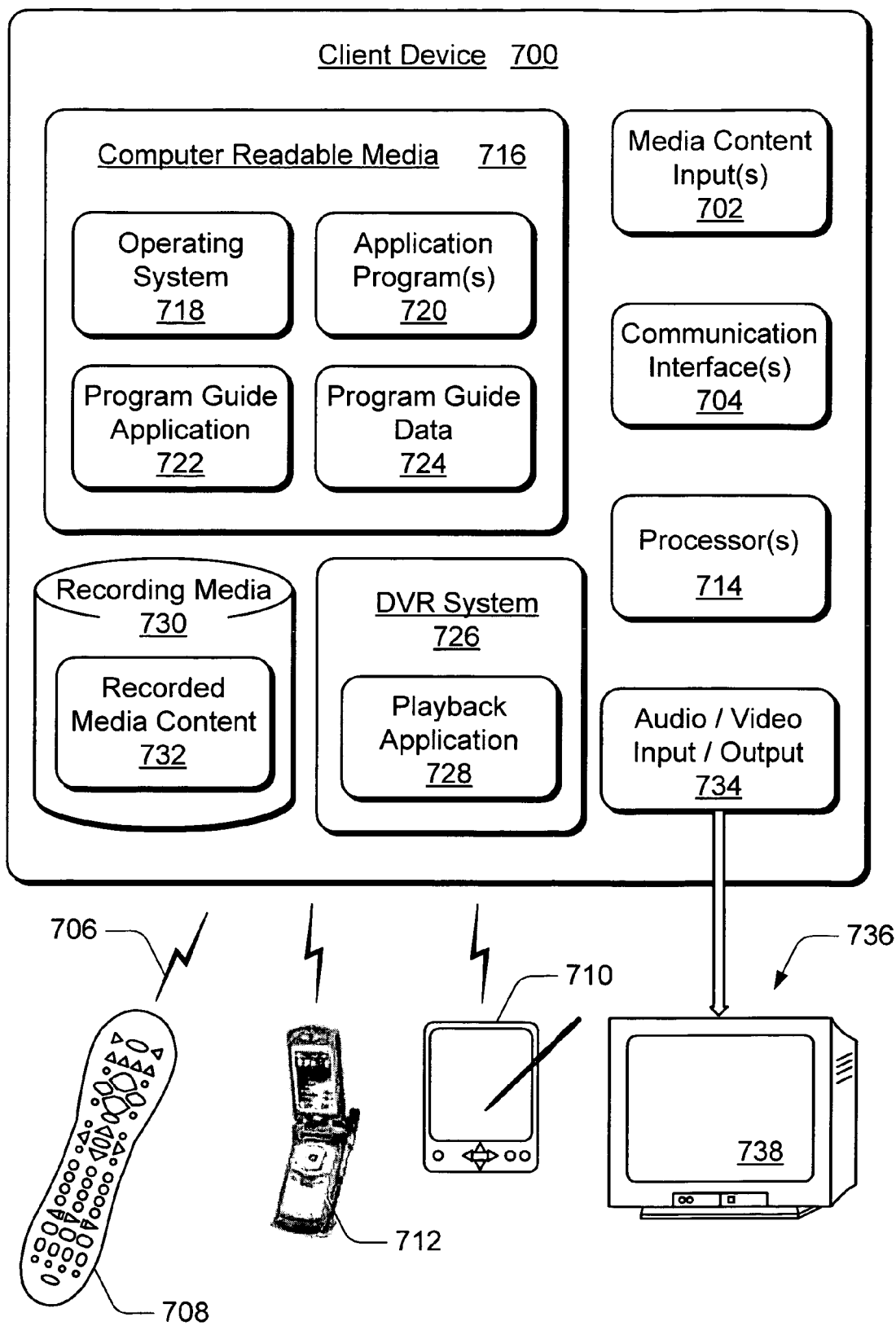
FIG. 7 illustrates various components of an exemplary client device in which embodiments of interactive job channel can be implemented.

FIG. 7 illustrates various components of an exemplary client device 700 which can be implemented as any form of a computing, electronic, and/or television-based client device, and in which embodiments of interactive job channel can be implemented. For example, the client device 700 can be implemented as the television-based client device 102 shown in FIG. 1 and/or as any one of the television-based client devices 610(1-N) shown in FIG. 6 as part of the viewing system 604.

Client device 700 includes one or more media content inputs 702 which may include Internet Protocol (IP) inputs over which streams of media content are received via an IP-based network. Device 700 further includes communication interface(s) 704 which can be implemented as any one or more of a serial and/or parallel interface, a wireless interface, any type of network interface, a modem, and as any other type of communication interface. A wireless interface enables client device 700 to receive control input commands 706 and other information from an input device, such as from remote control device 708, PDA (personal digital assistant) 710, cellular phone 712, or from another infrared (IR), 802.11, Bluetooth, or similar RF input device.

A network interface provides a connection between the client device 700 and a communication network by which other electronic and computing devices can communicate data with device 700. Similarly, a serial and/or parallel interface provides for data communication directly between client device 700 and the other electronic or computing devices. A modem facilitates client device 700 communication with other electronic and computing devices via a conventional telephone line, a DSL connection, cable, and/or other type of connection.

Client device 700 also includes one or more processors 714 (e.g., any of microprocessors, controllers, and the like) which process various computer executable instructions to control the operation of device 700, to communicate with other electronic and computing devices, and to implement embodiments of interactive job channel. Client device 700 can be implemented with computer readable media 716, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer readable media 716 provides data storage mechanisms to store various information and/or data such as software applications and any other types of information and data related to operational aspects of client device 700. For example, an operating system 718 and/or other application programs 720 can be maintained as software applications with the computer readable media 716 and executed on processor(s) 714 to implement embodiments of interactive job channel.

For example, client device 700 can be implemented to include a program guide application 722 that is implemented to process program guide data 724 and generate program guides for display which enable a viewer to navigate through an onscreen display and locate broadcast programs, recorded programs, video on-demand programs and movies, interactive game selections, network-based applications, and other media access information or content of interest to the viewer. The application programs 720 can include a programmed application 118, 126 to implement features and embodiments of interactive job channel as described herein. Alternatively, a programmed application can be implemented as an integrated module or component of the program guide application 722 to implement embodiments of interactive job channel. The client device 700 can also include a DVR system 726 with playback application 728, and recording media 730 to maintain recorded media content 732.

The client device 700 also includes an audio and/or video output 734 that provides audio and video to an audio rendering and/or display system 736, or to other devices that process, display, and/or otherwise render audio, video, and image data. Video signals and audio signals can be communicated from device 700 to a television 738 (or to other types of display devices) via an RF (radio frequency) link, S-video link, composite video link, component video link, analog audio connection, or other similar communication link.

Figure 8:
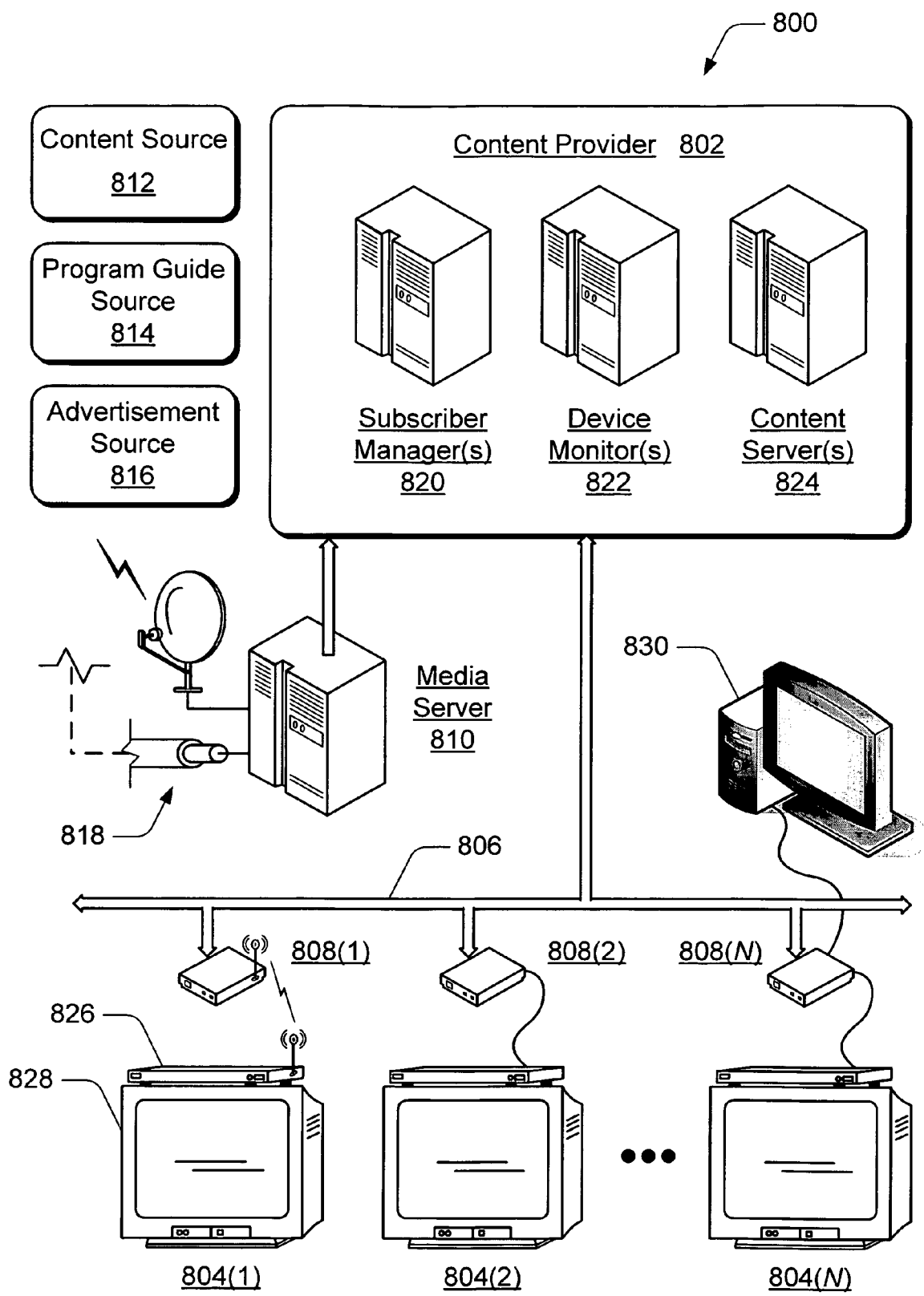
FIG. 8 illustrates various devices and components in an exemplary entertainment and information system in which embodiments of interactive job channel can be implemented.

FIG. 8 illustrates an exemplary entertainment and information system 800 in which an IP-based television environment can be implemented, and in which embodiments of interactive job channel can be implemented. System 800 facilitates the distribution of program content, program guide data, and advertising content to multiple viewers and to multiple viewing systems. System 800 includes a content provider 802 and television-based client systems 804(1-N) each configured for communication via an IP-based network 806. Each television-based client system 804(1-N) is an example of the television-based client system 606(1) described with reference to FIG. 6. Each of the television-based client systems 804(1-N) can receive one or more data streams from content provider 802 and then arbitrate stream allocation to distribute the data streams, one each, to one or more other satellite client devices in a viewing system.

The network 806 can be implemented as a wide area network (e.g., the Internet), an intranet, a Digital Subscriber Line (DSL) network infrastructure, or as a point-to-point coupling infrastructure. Additionally, network 806 can be implemented using any type of network topology and any network communication protocol, and can be represented or otherwise implemented as a combination of two or more networks. A digital network can include various hardwired and/or wireless links 808(1-N), routers, gateways, and so on to facilitate communication between content provider 802 and the client systems 804(1-N). The television-based client systems 804 (1-N) receive program content, program guide data, advertising content, closed captions data, and the like from content server(s) of the content provider 802 via the IP-based network 806.

System 800 includes a media server 810 that receives program content from a content source 812, program guide data from a program guide source 814, and advertising content from an advertisement source 816. In an embodiment, the media server 810 represents an acquisition server that receives the audio and video program content from content source 812, an EPG server that receives the program guide data from program guide source 814, and/or an advertising management server that receives the advertising content from the advertisement source 816.

The content source 812, the program guide source 814, and the advertisement source 816 control distribution of the program content, the program guide data, and the advertising content to the media server 810 and/or to other television-based servers. The program content, program guide data, and advertising content is distributed via various transmission media 818, such as satellite transmission, radio frequency transmission, cable transmission, and/or via any number of other wired or wireless transmission media. In this example, media server 810 is shown as an independent component of system 800 that communicates the program content, program guide data, and advertising content to content provider 802. In an alternate implementation, media server 810 can be implemented as a component of content provider 802.

Content provider 802 is representative of a headend service in a television-based content distribution system, for example, that provides the program content, program guide data, and advertising content to multiple subscribers (e.g., the television-based client systems 804(1-N)). The content provider 802 can be implemented as a satellite operator, a network television operator, a cable operator, and the like to control distribution of program and advertising content, such as movies, television programs, commercials, music, and other audio, video, and/or image content to the client systems 804(1-N).

Content provider 802 includes various components to facilitate media data processing and content distribution, such as a subscriber manager 820, a device monitor 822, and a content server 824. The subscriber manager 820 manages subscriber data, and the device monitor 822 monitors the client systems 804(1-N) (e.g., and the subscribers), and maintains monitored client state information.

Although the various managers, servers, and monitors of content provider 802 (to include the media server 810 in one embodiment) are illustrated and described as distributed, independent components of content provider 802, any one or more of the managers, servers, and monitors can be implemented together as a multi-functional component of content provider 802. Additionally, any one or more of the managers, servers, and monitors described with reference to system 800 can implement features and embodiments of interactive job channel.

The television-based client systems 804(1-N) can be implemented to include a client device 826 and a display device 828 (e.g., a television). A client device 826 of a television-based client system 804 can be implemented in any number of embodiments, such as a set-top box, a digital video recorder (DVR) and playback system, an appliance device, a gaming system, and as any other type of client device that may be implemented in a television-based entertainment and information system. In an alternate embodiment, client system 804(N) is implemented with a computing device 830 as well as a client device 826. Additionally, any of the client devices 826 of a client system 804 can implement features and embodiments of interactive job channel as described herein.

Although embodiments of interactive job channel have been described in language specific to structural features and/or methods, it is to be understood that the subject of the appended claims is not necessarily limited to the specific features or methods described. Rather, the specific features and methods are disclosed as exemplary implementations of interactive job channel.

The invention claimed is:

1. A system, comprising:
   a website provided by a content provider for a viewer to register an employment profile, wherein the content provider obtains an identifier of the viewer from the employment profile;
   an application programmed to identify employment-related media content received from one or more employers that corresponds with the employment profile registered by the viewer at the website, the application being executed at least in part by one or more servers at the content provider,
   wherein, in response to the viewer registering the employment profile at the website, the application is configured to obtain the identifier from the employment profile of the viewer, and correlate the identifier to a television-based client device located at a location of the viewer for receiving content from the content provider for matching the television-based client device with the employment profile of the viewer at the website; and
   an interactive job channel provided by the content provider that is selectable by the viewer at the television-based client device to view employment-related media content delivered to the television-based client device,
   wherein, following correlation of the identifier obtained from the employment profile registered at the website with the television-based client device, targeted employment-related media content associated with the employment profile is delivered to the television-based client device as a result of the viewer tuning the television-based client device to the interactive job channel, wherein the targeted employment-related media content delivered to the television-based client device is previously determined to correspond to the employment profile registered by the viewer at the website,
   wherein the employment-related media content corresponding to the employment profile registered by the viewer includes a ticker display of job listings that are available employment positions targeted to the viewer based on the employment profile registered by the viewer,
   wherein the application is configured to receive a viewer selectable input via the television-based client device to select a job listing displayed on the interactive job channel.

2. A system as recited in claim 1,
   wherein the application is further configured to identify the job listing at the website of the content provider, and
   wherein, as a result of the viewer selecting the job listing via the television-based client device, the job listing is distinguished to the viewer when the viewer accesses the website.

3. A system as recited in claim 1, further comprising additional employment-related media content provided by the content provider for viewing via the interactive job channel, the additional employment-related media content targeted to viewers within a designated region based on a location of a television-based client device registered to each of the viewers.

4. A system as recited in claim 1, wherein the application is further configured to record an audio message or video message received from the viewer through the television-based client device recorded using video conferencing components at the television-based client device, and communicate the audio or video message directly to an employer associated with the selected job listing for indicating to the employer that the viewer is interested in the selected job listing.

5. A system as recited in claim 1, wherein the employment-related media content further includes video on-demand assets from an employer seeking to employ the viewer.

6. A system as recited in claim 1, wherein the employment-related media content includes any one or combination of employment information about an employer, advertisements to attract prospective employees, instructional videos for the prospective employees, and job listings of available employment positions.

7. A system as recited in claim 1, wherein, as a result of receiving the viewer selectable input selecting the job listing via the television-based client device, the application communicates the employment profile obtained from the website to an employer corresponding to the job listing without requiring additional input from the viewer.

8. A system as recited in claim 7, wherein a job listing of an available employment position is selectable to initiate displaying a list of viewer selectable options at the television based client device, the list of viewer selectable options including at least one of:
   communicate the employment profile of the viewer to an employer associated with the job listing;
   distinguish the job listing at a website of the content provider for additional viewer input;
   record an audio message from the viewer for communication to the employer associated with the job listing; or
   record a video message from the viewer for communication to the employer associated with the job listing.

9. A system as recited in claim 1, wherein, when a different viewer having a different television-based client device viewing the interactive job channel has not registered at the website of the content provider, the application is programmed to initiate displaying of advertisements to encourage the different viewer to register an employment profile at the website of the content provider.

10. A system as recited in claim 9, wherein some portions of the application are stored and executed at the content provider and other portions of the application are stored and executed at the television-based client device.

11. A method, comprising:
registering an employment profile of a viewer at a website provided by a server of a content provider, wherein the content provider also provides employment-related media content via a television-based system;
as a result of receiving the employment profile at the website, correlating, by the content provider, an identifier of the viewer obtained from the website from the employment profile with a television-based client device located at a location of the viewer;
associating employment-related media content with the viewer in response to receiving the employment profile of the viewer entered at the website;
providing an interactive job channel tunable by the television-based client device to view the employment-related media content delivered to the television-based client device;
as a result of the viewer tuning the television-based client device to the interactive job channel, providing the employment-related media content that is associated with the viewer to the television-based client device correlated with the identifier of the viewer obtained from the website, the employment-related media content provided for viewing on the interactive job channel having been selected for viewing by the viewer based on the employment profile obtained from the website, wherein the employment-related media content is provided to include a ticker display of job listings that are available employment positions targeted to the viewer based on the employment profile registered by the viewer; and
receiving a viewer selectable input via the television-based client device to select a job listing displayed on the interactive job channel.

12. A method as recited in claim 11, further comprising:
identifying the job listing at the website of the content provider; and
as a result of receiving the viewer selectable input via the television-based client device, distinguishing the job listing to the viewer when the viewer accesses the website.

13. A method as recited in claim 11, as a result of receiving the viewer selectable input selecting the job listing via the television-based client device, communicating the employment profile to an employer corresponding to the job listing without requiring additional input from the viewer.

14. A method as recited in claim 13, further comprising:
initiating a displaying of advertisements for encouraging a different viewer to register an employment profile at the website of the content provider when the different viewer having a different television-based client device viewing the interactive job channel has not registered at the website of the content provider.

15. A method as recited in claim 11, further comprising:
recording an audio message or video message from the viewer using video conferencing components at the television-based client device; and
communicating the audio or video message received from the television-based client device directly to an employer associated with the selected job listing for indicating to the employer that the viewer is interested in the selected job listing.

16. A system, comprising:
a website provided by a content provider for enabling a viewer to register an employment profile, wherein the content provider obtains an identifier of the viewer from the employment profile;
an application programmed to identify employment-related media content received from one or more employers that corresponds with the employment profile registered by the viewer at the website,
wherein at least a portion of the application is executed by one or more servers at the content provider, the one or more servers being in communication with a television-based client device via a network, wherein the television-based client device is located at a location of the viewer, wherein the television-based client device is tunable to an interactive job channel provided by the content provider that is selectable by the viewer at the television-based client device to view employment-related media content provided by the content provider,
wherein, as a result of receiving the employment profile of the viewer at the website, the application is configured to correlate the identifier obtained at the website from the employment profile of the viewer with the television-based client device for matching the television-based client device with the employment profile of the viewer registered at the website,
wherein, following correlation of the identifier of the viewer with the television-based client device, the application is configured to deliver the identified employment-related media content that corresponds with the employment profile registered by the viewer at the website to the television-based client device as a result of the television-based client device being tuned to the interactive job channel, wherein the employment-related media content corresponding to the employment profile of the viewer is provided to the viewer for viewing via the television-based client device,
wherein the employment-related media content that corresponds with the employment profile registered by the viewer includes a ticker display of job listings that are available employment positions targeted to the viewer based on the employment profile registered by the viewer,
wherein the application is configured to receive a viewer selectable input via the television-based client device when the viewer selects a job listing displayed on the interactive job channel,
wherein, as a result of receiving the viewer selectable input selecting the job listing via the television-based client device, the application communicates the employment profile obtained from the website to an employer corresponding to the job listing without requiring additional input from the viewer,
wherein the application is configured to identify the job listing at the website of the content provider as result of receiving the selection via the television-based client device, and
wherein, as a result of the viewer selecting the job listing via the television-based client device, the application is configured to distinguish the job listing to the viewer when the viewer accesses the website.

17. A system as recited in claim 16, wherein, when the application receives the viewer selectable input to select a job listing displayed on the interactive job channel, the application is further configured to record an audio message or video message from the viewer via the television-based client device using video conferencing components at the television-based client device, and communicate the audio or video message directly to an employer associated with the selected job listing for indicating to the employer that the viewer is interested in the selected job listing.

18. A system as recited in claim 16, wherein when a different viewer having a different television-based client device viewing the interactive job channel has not registered at the website of the content provider, the application is programmed to initiate displaying of advertisements for the different viewer to encourage the different viewer to register an employment profile at the website of the content provider.

* * * * *